Nov. 28, 1939. C. A. CAMPBELL ET AL 2,181,224
VALVE FOR WATER SYSTEMS OF RAILWAY CARS
Filed Sept. 12, 1938
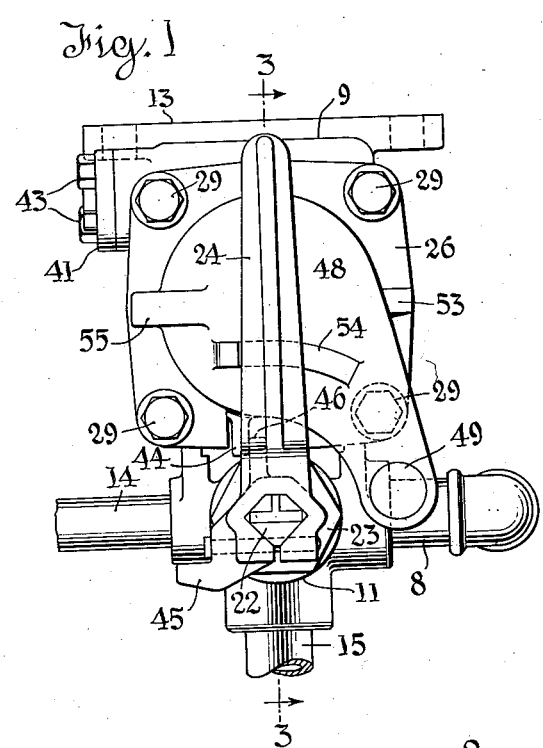
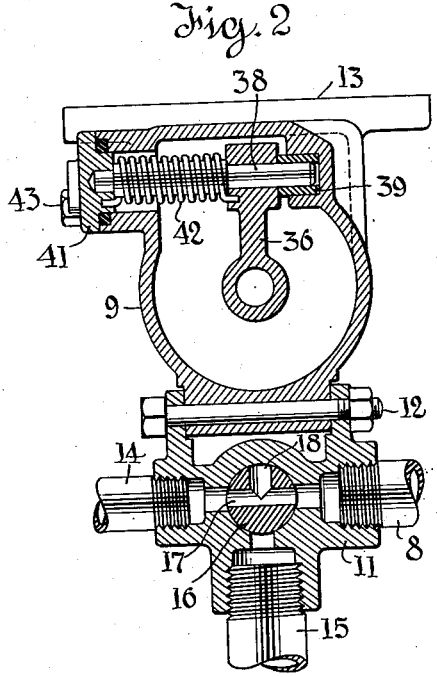
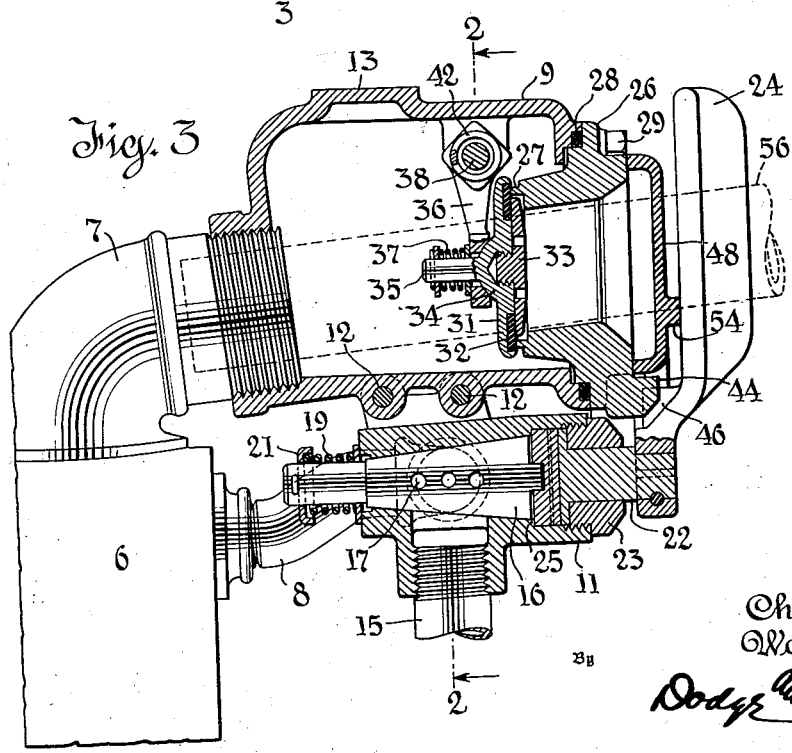
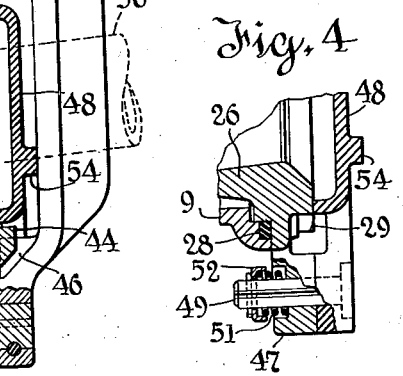
Inventor
Charles A. Campbell
Wayne A. Baldwin
Attorneys Patented Nov. 28, 1939

2,181,224

UNITED STATES PATENT OFFICE 2,181,224

VALVE FOR WATER SYSTEMS OF RAILWAY CARS

Charles A. Campbell and Wayne A. Baldwin, Watertown, N. Y., assignors to The New York Air Brake Company, a corporation of New Jersey Application September 12, 1938, Serial No. 229,614

5 Claims. (Cl. 221—74)

This invention relates to the water raising systems commonly used on railway cars. The water tanks are usualy suspended beneath the car and the pressure necessary to lift the water through the service pipes in the car is derived from the air brake system.

The air is taken from the supply reservoir in the case of cars equipped with D-22 control valves, while on cars equipped with U-C valves the supply is taken from the emergency reservoir. The usual practice is to take the air through a pressure responsive valve which opens only when the reservoir is substantially charged. The air so derived is passed through a pressure reducing valve which delivers air under reduced pressure to the space above the water in the tanks. In this way the water in the tanks is kept under a suitable pressure head. To fill the tank, the operation is, first, to cut off the supply of air to the tank, then vent the tank, and finally, open the filling cap and fill the tank with water, after which a reverse sequence of operations must take place to seal the tank and subject it once more to air pressure.

The object of the present invention is to provide a simple and sanitary water filling connection for such tanks. Generally stated, the air supply to the tank is controlled by a two-position valve. In the normal or operative position, this valve closes the vent and admits air pressure to the top of the tank. In the filling position, the same valve cuts off the air supply and vents the tank.

The handle of the valve controls the movements of the dust cover, which does not seal the water filling opening tightly against air pressure, but which does close it tightly enough to exclude dirt and dust. This cover is so related to the handle of the air valve that it may be opened when the air valve is in venting position, and will be closed and sealed as an incident to return of the valve to charging position.

The function of retaining the air pressure in the tank under normal or running conditions is performed by a check valve of special form. This valve is mounted for limited universal movement on a hinged arm, the arm being spring pressed to carry the valve against its seat. After the air valve has been moved to venting position and the dust cover has been swung out of the way, the operator inserts the nozzle of the filling hose and this nozzle strikes the check valve from its seat and swings it back into a recess, permitting the nozzle to pass the valve and enter the filling opening at the top of the tank. The check valve has a rubber seating gasket which is retained by a combined gasket clamp and strike plate, so designed that the nozzle of the filling hose can never strike the gasket but will engage the strike plate and force the valve back, without injury to the gasket.

The preferred embodiment of the invention will now be described with reference to the accompanying drawing, in which:

Figure 1 is a face view of the filling valve with the dust cap closed and sealed, and the air valve in normal or running position, in which it admits air pressure to the tank and closes the vent;

Fig. 2 is a section on the line 2—2 of Fig. 3. It shows the porting of the air valve and the construction of the guiding arm for the check valve;

Fig. 3 is a view showing the mechanism in vertical axial section on the line 3—3 of Fig. 1. In this view, the tank and the connections between the tank and the valve mechanism are shown; and Fig. 4 is a fragmentary view showing how the dust cap is hinged to the cover ring.

The upper outer corner of the water tank is indicated at 6. 7 is a water filling elbow connection leading through the top of the tank, and 8 is a connection through which air under pressure is admitted to the top of the tank and vented therefrom. 9 is the hollow body of the water filling fitting. It is connected with the elbow 7 and it carries beneath it the body 11 of the air valve. The two are separately constructed and connected by bolts 12, but this separate construction is simply a matter of convenience in manufacture. On the upper face of the body 9 is a pad 13 with flanges and bolt holes by means of which the body 9 may be fastened to any suitable support carried by the car.

The body 11 of the air valve has an air supply connection 14 opposite the connection 8 and an exhaust or vent connection 15 at 90° thereto. The body has a taper bore for the tapered cock plug 16 which has three through ports 17 which, in normal position, connect supply connection 14 with the connection 8 to the water tank. There are also lateral ports 18 leading from ports 17 so that when the plug 16 is turned 90° clockwise from the position shown in Fig. 2, supply connection 14 is blanked and connection 8 is opened to vent connection 15.

Plug 16 is held seated by compression spring 19 which encircles its small end and reacts against seat washer 21 held by a cotter pin. The valve has a cross rib on its large end. Key 22 also has a cross rib and turns in the bonnet 23 screwed into the end of body 11. The key and plug are connected by an Oldham coupling comprising the disc 20 with cross slots on its opposite face and at 90° to each other. A handle 24 is fixed on key 22. Since disc 20 seats on a shoulder 25 and sustains the key, this arrangement permits the valve to seat without entailing axial motion of the key. Hence, the path of the handle 24 is definite and independent of wearing-in of the plug.

The open front of body 9 receives the cover ring 26 having a filling opening surrounded at the rear by seat rib 27 for the check valve. It is sealed to the body by gasket 28 and is held by machine screws 29 as shown.

The check valve comprises a disc 31 with gasket 32 and combined strike plate and gasket retainer 33 threaded into disc 31. On the rear of disc 31 is a spherical boss 34 with stem 35, the boss engaging a conforming seat in and the stem passing through a hole in the end of swinging arm 36. A coil compression spring 37 surrounding the stem with suitable washers and cotter pin, draws the boss against the seat in the arm, so that the valve has limited universal tilting motion relatively to the arm.

The arm 36 is mounted on shaft 38 journaled at one end in bushing 39 and at the other end in cap 41. A torsion spring 42 encircles shaft 38, one end engaging a hole in arm 36 and the other a hole in cap 41. The spring is stressed by turning the cap and then fastening the cap by the machine screws 43. Thus, the stress of the spring may be adjusted by increments of one-half turn. The stress need be only sufficient to ensure an initial seal as the air pressure in the system acts to seat the valve. The cap 41 is sealed by a gasket, as shown.

The cover ring 26 carries a lug 44 which coacts with lugs 45 and 46 on handle 24 to limit the throw of handle to 90° and also limits the closing movement of the dust cap hereinafter described. It also carries a lug 47 to which the dust cap 48 is hinged as shown in Fig. 4. The hinge pin 49 is retained by spring 51 acting against the spring seat 52. Thus, the pin 49 may move outward in the direction of its axis to permit cap 48 to ride up the inclined lug 53, as it closes. The dust cap must close before handle 24 can be swung to the position of Fig. 1. As the handle is swung to this position it engages the inclined lug 54 and cams the dust cap to its seat.

Assuming the parts to be in running position as shown, the tank may be filled with water as follows. Handle 24 is swung clockwise 90°. This cuts off the air supply and then vents tank 6, relieving pressure on the check valve. The operator then grasps finger lug 55 and swings cap 48 clockwise. He then inserts the nozzle, striking back the check valve. The inserted position of the nozzle is indicated at 56 in dotted lines. When the tank has been filled, he withdraws the nozzle, whereupon the check valve swings to its seat. Before he can swing valve handle 24 reversely, the operator must swing dust cap 48 closed. When he has done so, he can swing handle 24 counter-clockwise 90°, closing the vent, opening the air pressure supply to tank 6 and camming the dust cap closely to its seat.

While one embodiment has been described in considerable detail, this description is intended to be illustrative and not limiting.

What is claimed is:

1. A filling mechanism for tanks operated under pneumatic pressure, comprising in combination with the tank and means for supplying air under pressure; an air valve having a normal position in which it connects the tank and air supply means and a filling position in which it disconnects them and vents the tank; a filling housing communicating with the tank and having a filling opening adapted to receive a filling nozzle; an inward-opening check valve for sealing said opening and arranged to be opened by the insertion of a filling nozzle; a dust cap for closing said filling opening; and means operable by motion of the air valve from filling to normal position to seat said dust cap tightly.

2. The combination defined in claim 1, in which the air valve has a swinging handle and the dust cap is hinged to swing on an axis parallel with the axis on which said handle swings and obstructs motion of said handle when the dust cap is open.

3. The combination defined in claim 1 in which the inward opening check valve is mounted for limited universal rocking motion on a swinging arm adapted to carry the valve out of the path of the inserted nozzle; and yielding means provided to urge the arm and the valve to closed position.

4. A filling mechanism for tanks operated under pneumatic pressure, comprising in combination with the tank and means for supplying air under pressure; an air valve having a normal position in which it connects the tank and air supplying means and a filling position in which it disconnects them and vents the tank; a filling housing communicating with the tank and having a filling opening adapted to receive a filling nozzle; an inward-opening check valve controlling said opening and comprising a swinging arm, a valve mounted for at least limited universal tilting motion on said arm and means yieldingly urging the arm in a valve closing direction; a dust cap hinged to swing over said opening to protect the same; and cam means reacting between a component of the air valve and the dust cap and serving to force the cap closed as the valve is shifted from filling to normal position.

5. A filling mechanism for tanks operated under pneumatic pressure, comprising in combination with the tank and means for supplying air under pressure; an air valve having a normal position in which it connects the tank and air supplying means and a filling position in which it disconnects them and vents the tank; a filling housing communicating with the tank and having a filling opening adapted to receive a filling nozzle; an inward-opening check valve for sealing said opening and arranged to be opened by insertion of a filling nozzle; a dust cap for closing said filling opening; an actuator for said valve adapted to hold said cap closed in normal position of said valve; and a self-aligning drive connection between said actuator and said valve.

CHARLES A. CAMPBELL.
WAYNE A. BALDWIN.